United States Patent
Heinrichs

(10) Patent No.: US 8,147,606 B2
(45) Date of Patent: Apr. 3, 2012

(54) WAX COMPOSITIONS AND ITS USE

(75) Inventor: Franz-Leo Heinrichs, Gablingen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 12/693,532

(22) Filed: Jan. 26, 2010

(65) Prior Publication Data

US 2010/0126385 A1  May 27, 2010

Related U.S. Application Data

(62) Division of application No. 11/711,229, filed on Feb. 27, 2007, now abandoned.

(30) Foreign Application Priority Data

Feb. 28, 2006 (DE) .......................... 10 2006 009 097

(51) Int. Cl.
C08G 69/08 (2006.01)
C08K 5/20 (2006.01)
C08L 91/06 (2006.01)

(52) U.S. Cl. ................ 106/270; 524/191; 528/310
(58) Field of Classification Search .............. 524/191; 528/310; 106/270
See application file for complete search history.

(56) References Cited

U.S. PATENT DOCUMENTS

| | | | | |
|---|---|---|---|---|
| 5,743,949 A * | 4/1998 | Kainz | ............................. | 106/271 |
| 5,810,919 A | 9/1998 | Olzak et al. | | |
| 5,936,018 A | 8/1999 | Muller et al. | | |
| 6,391,189 B1 * | 5/2002 | Heinrichs | ........................ | 208/21 |
| 6,761,764 B2 * | 7/2004 | Krendlinger et al. | .......... | 106/502 |
| 2006/0041101 A1 * | 2/2006 | Heinrichs et al. | .............. | 528/310 |

FOREIGN PATENT DOCUMENTS

| | | |
|---|---|---|
| EP | 0845492 | 6/1998 |
| GB | 677935 | 8/1952 |
| WO | WO 0068329 | 11/2000 |
| WO | WO 03/104318 | 12/2003 |

OTHER PUBLICATIONS

Dictinary.com, "Thermoplastic" accessed Feb. 17, 2011.*
USPTO Office Action for U.S. Appl. No. 10/517,117; mailed May 28, 2008.
USPTO Office Action for U.S. Appl. No. 10/517,117; mailed Mar. 16, 2009.
USPTO Office Action for U.S. Appl. No. 10/517,117; mailed Mar. 24, 2010.
English Abstract for DE 2730175, Jan. 19, 1978.
English Abstract for DE 19929862, Jan. 11, 2001.
English Abstract for FR 2765229, Dec. 31, 1998.

* cited by examiner

*Primary Examiner* — David M Brunsman
(74) *Attorney, Agent, or Firm* — Anthony A. Bisulca

(57) ABSTRACT

A wax composition comprises at least three amide waxes A, B, and C, where
amide wax A is the reaction product of alkylenediamine with linear fatty acids or with mixtures composed of fatty acids,
amide wax B is the reaction product of alkylenediamine with 12-hydroxystearic acid, and
amide wax C is the reaction product of alkylenediamine with 12-hydroxystearic acid and with linear fatty acids.
The wax composition is suitable as a processing aid in engineering thermoplastics or for the preparation of solvent-based wax pastes or the preparation of wax micronizates for coatings or for the preparation of aqueous dispersions.

3 Claims, No Drawings

WAX COMPOSITIONS AND ITS USE

This application is a division of 11/711,229, filed Feb. 27, 2007 now abandoned.

The present invention is described in the German priority application No. 10 2006 009 097.7, filed 28. Feb. 2006, which is hereby incorporated by reference as in fully disclosed herein.

The invention relates to a wax composition composed of at least three components and to its use as additive in plastics processing, as matting agent, as rheological agent, as slip additive, or for the preparation of dispersions. The components present in the wax composition have been selected from the amide waxes group.

Conventional plastics, such as PVC or styrene, and also engineering thermoplastics, such as polyamide, polycarbonate, polyalkylene terephthalate, polyoxymethylene, polyphenylene oxide, or thermoplastic polyurethane are widely processed by the injection-molding technique. Process optimization therefore places particular importance on what is known as mold-release behavior and flow behavior of the relevant plastics. Small amounts of external processing aids are added to the plastics in order to adjust these features. Important factors with these processing aids are both their internal action and their external action.

For internal action, such as control of rheological properties of the melt, reduction of friction, dispersion of additives and of colorants, substances with good compatibility with the polymer are needed. In contrast, for external action, e.g. in the form of lubricants and release agents, substances having some degree of incompatibility with the polymer are needed. Another factor that has to be considered is that the chemical structure of engineering thermoplastics makes them especially susceptible to hydrolysis, and that acidic or basic additives therefore lead to uncontrolled side-reactions in these thermoplastics and simply for this reason are not suitable as processing aids.

These varied, complex, and often contradictory requirements placed upon ideal processing aids are satisfied by only a very small group of substances. Among these are fatty acid derivatives, waxes, and, with some restrictions, metal soaps, polyesters, or amides. However, even these substances continually give rise in particular cases to disadvantages, which have to be accepted in the absence of a better alternative.

Although fatty acids are excellent processing aids, they promote polymer degradation and at the, often high, processing temperatures reached by plastics during injection molding they are volatile and escape in the form of fume. Soaps can easily decompose in the presence of acidic constituents and then behave in exactly the same way as fatty acids. Fatty acid esters are often excessively polar and in polar plastics exhibit only internal action, whereas in nonpolar plastics a marked tendency toward migration is observed. The behavior of the amides of stearic acid, erucic acid, or oleic acid is similar to that of the fatty acid esters.

For improvement of formulations for injection molding, the preferred trend is therefore in the direction of longer-chain compounds, for example those derivable from montan wax acid and from its derivatives, or toward reaction products of long-chain fatty acids with diamines. The prior art uses reaction products of stearic acid or of palmitic acid with ethylenediamine. However, the ideal balance has not yet been found between internal action and external action.

It was therefore an object to find a suitable processing aid intended for plastics during injection molding and which on the one hand provides adequate internal action but at the same time also exhibits good lubricant action and release action at the surface of the plastic, without at the same time inhibiting or preventing further treatment of the surface of the plastic via excessive migration.

Surprisingly, it has been found that this object can be achieved via the use of a specific combination of amide waxes as components of a wax composition. The expression "amide waxes" is intended to be defined as a collective term for a product group which is the result of reaction of a long-chain carboxylic acid with a mono- or polyfunctional amine or with ammonia.

The invention achieves the object via a wax composition of the type mentioned at the outset which comprises a combination composed of at least three amide waxes A, B, and C, and the characterizing feature of which is that amide wax A is the reaction product of alkylenediamine with linear fatty acids or with mixtures composed of fatty acids, amide wax B is the reaction product of alkylenediamine with 12-hydroxystearic acid, and amide wax C is the reaction product of alkylenediamine with 12-hydroxystearic acid and with linear fatty acids.

Reaction products of ethylenediamine and stearic acid or palmitic acid, olamide, erucaamide, stearylamide are available industrially.

In the case of the inventive wax composition composed of the amide waxes A, B, and C, these being surprisingly suitable as processing aids during the injection molding of plastics with optimized internal and external action, in contrast, suitable amounts of three different components A, B, and C are combined with one another.

Amide wax A is reaction products of alkylenediamine, preferably of ethylenediamine, with linear fatty acids or mixtures of fatty acids, for example tallow fatty acid, coconut fatty acid, stearic acid, palmitic acid, behenic acid, or erucic acid, having the structure

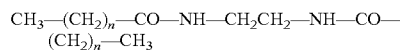

where n=from 6 to 20.

Amide wax B is the reaction product of alkylenediamine, preferably of ethylenediamine, with 12-hydroxystearic acid, preferably having the following composition:

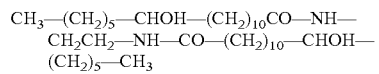

Amide wax C is the reaction product of alkylenediamine, preferably of ethylenediamine, with 12-hydroxystearic acid and with linear fatty acids, preferably having the structure:

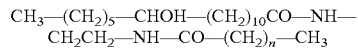

where n=from 6 to 20.

The inventive wax composition preferably comprises an amount in the range from 1 to 85% by weight of amide wax A, an amount in the range from 1 to 85% by weight of amide wax B, and an amount in the range from 1 to 50% by weight of amide wax C, based in each case on the total weight of the wax composition.

In one particularly preferred embodiment of the invention, the wax composition comprises an amount in the range from 5 to 75% by weight of amide wax A, an amount in the range from 5 to 75% by weight of amide wax B, and an amount in the range from 1 to 40% by weight of amide wax C, again based in each case on the total weight of the wax composition.

The reaction of the starting materials with alkylenediamine, preferably with ethylenediamine, for preparation of the amide waxes takes place at temperatures above 100° C. In particular, the fatty acid mixtures are placed in a reactor where they are melted under an inert gas. At temperatures around 140° C., ethylenediamine is metered, with stirring, into the resultant melt. After feed of the stoichiometrically prescribed amount of ethylenediamine, the temperature is further increased to 190° C., and stirring is continued, with removal of the water of reaction by distillation, until both the acid number AcN and the alkali number AlN have fallen below the value 6. The acid number AcN is determined to DIN EN ISO 3682 to monitor the progress of the reaction, the alkali number AlN being determined to DGF method H III 2a (92).

The inventive wax compositions are then prepared from the amide waxes A, B, and C of the preparation examples via mixing. The precise composition of the wax compositions is analyzed by gas chromatography.

Surprisingly, it has been found that the inventive wax compositions comprising at least the amide waxes A, B, and C have particular suitability as processing aids for the injection molding of conventional plastics, such as PVC or styrene, or of engineering thermoplastics, such as polyamide, polycarbonate, polyalkylene terephthalate, polyoxymethylene, polyphenylene oxide, or for thermoplastic polyurethane. The amounts of the wax composition inventively added as processing aid to the plastics are in the range from 0.1 to 10% by weight, preferably from 0.2 to 5% by weight, particularly preferably from 0.2 to 2% by weight, based in each case on the total weight of plastic plus processing aid.

The inventive wax compositions can be employed as pure substances or can be mixed with known prior-art mixture components, such as polyethylene waxes, polypropylene waxes, amide waxes, Fischer-Tropsch waxes, and then can be micronized. The particle size here is advantageously adjusted within the range from 10 to 20 μm.

The inventive wax compositions can moreover also be dissolved in solvents at an elevated temperature and be precipitated via cooling. Pastes thus prepared can be used in print applications for control of viscosity and of slip behavior.

The invention will be further clarified for the person skilled in the art via the inventive examples below. All of the amounts stated in mixtures here are % by weight amounts unless otherwise stated. The following amide waxes were first prepared here:

Preparation example 1 for amide wax C,
1.5 mol of 12-hydroxystearic acid
0.5 mol of tallow fatty acid (35/65)
1.0 mol of ethylenediamine
AlN: 4.3/AcN: 4.7
Preparation example 2 for amide wax C:
1.0 mol of 12-hydroxystearic acid
1.0 mol of tallow fatty acid (35/65)
1.0 mol of ethylenediamine
AlN: 4.9/AcN: 4.9
Preparation example 3 for amide wax C,
1.5 mol of 12-hydroxystearic acid
0.5 mol of tallow fatty acid (45/55)
1.0 mol of ethylenediamine
AlN: 4.8/AcN: 4.3
Preparation example 4 for amide wax A:
0.5 mol of stearic acid
1.5 mol of tallow fatty acid (30/70)
1.0 mol of ethylenediamine
AlN: 4.1/AcN: 4.5
Preparation example 5 for amide wax B:
2.0 mol of 12-hydroxystearic acid
1.0 mol of ethylenediamine
AlN: 4.3/AcN: 4.7
Comparative example of the prior art, c1:
2.0 mol of tallow fatty acid (30/70)
1.0 mol of ethylenediamine
AlN: 5.1/AcN 4.8
Comparative example of the prior art, c2:
2.0 mol of pure stearic acid
1.0 mol of ethylenediamine
AlN: 5.3/AcN 4.9

The wax compositions are then prepared from the amide waxes A, B, and C of preparation examples 1 to 5. The exact composition of the inventive wax compositions is analyzed by means of GC. The composition by weight of the inventive wax compositions WC1 to WC4 and of the comparative mixture c1 and c2 of the prior art have been listed in the table below. These were then tested as processing aid in engineering plastics and in micronized form as additives in the coating.

|  | WC | WC2 | WC3 | WC4 | c1 | c2 |
|---|---|---|---|---|---|---|
| $C_{16}$-EDA-$C_{16}$ |  | 7 | 3 | 11.5 | 7 | 9 |
| $C_{16}$-EDA-$C_{18}$ |  | 25 | 11.5 | 28 | 31 | 42 |
| $C_{16}$-EDA-$C_{18}$—OH |  | 13 | 17.5 | 17 |  |  |
| $C_{18}$-EDA-$C_{18}$ |  | 24 | 10.5 | 17 | 37 | 49 | 100 |
| $C_{18}$-EDA-$C_{18}$—OH |  | 24 | 32.5 | 20.5 |  |  |
| $C_{18}$—OH-EDA-$C_{18}$—OH |  | 7 | 25 | 6 | 25 |  |
| Total | 100 | 100 | 100 | 100 | 100 | 100 |

Thermoplastic Polyurethane

An amount of 0.4% by weight of the wax compositions, based on the weight of the mixture composed of esterdiol and wax composition, was inserted into the esterdiol component during the preparation of thermoplastic polyurethane (TPU).

This mixture was reacted with diisocyanates to give the polyurethane. Injection moldings were then produced from the resultant polymers, Mold release and migration behavior at room temperature, at 60 and at 80° C. were evaluated and graded (low-number grades here indicating best performance).

Tests were carried out on the inventive products comprising wax compositions WC1 to WC4, the mixture 1, and pure EBS c2, and also on a commercially available derivative of montan wax acid. The data showed that the inventive products can significantly improve migration behavior at an adequate level of demolding force.

| Performance in thermoplastic polyurethane | | | | | | |
|---|---|---|---|---|---|---|
|  | WC1 | WC2 | WC3 | WC4 | c1 | c2 | Montan wax derivative |
| Demolding | 1.6 | 1.9 | 1.5 | 1.8 | 1.5 | 2.9 | 3 |
| Migration 23° C. | 2.5 | 1.5 | 2.5 |  | 3.5 | 3 | 1.5 |

-continued

Performance in thermoplastic polyurethane

|  | WC1 | WC2 | WC3 | WC4 | c1 | c2 | Montan wax derivative |
|---|---|---|---|---|---|---|---|
| Migration 60° C. | 3 | 1.5 | 2.5 | 3 | 2.5 | 3 | 1.5 |
| Migration 80° C. | 3 | 4 | 3 | 3 | 6 | 6 | 1.5 |

Use in polystyrene

Injection-molding behavior of polystyrene in combination with the inventive wax compositions was tested in a ratio of 95/5, 90/10, and 85/15, For comparison, pure polystyrene was tested, as were the combinations with the substances of the prior art. The measurements made were the separation force in newtons, the flow path within the test spiral in cm, color, transparency, exudation and lubricant action, these being evaluated against the standard by giving grades (low-number grades indicating best performance).

Commercially available products were used as comparison. c1 is Hostalub FA 1 and c3 is Hostalub FA 5. The experiments showed that the inventive wax compositions improved flow behavior and migration behavior at identical demolding force. The inventive products remain within the matrix and do not exude even when the amounts added are relatively high.

Performance test in polystyrene, 95/05

|  | Styrene | c1 | c3 | WC1 | WC2 | Unit |
|---|---|---|---|---|---|---|
| Exudation | — | 3 | 3 | 2 | 2 | — |
| Color | 1 | 2 | 4 | 2 | 2 | — |
| Flow behavior | 63 | 63 | 63 | 64 | 64 | cm |
| Lubricant action | — | 2 | 2 | 2 | 2 | — |
| Mixture 85/15 |  | 3 | 4 | 2 | 2 |  |
| Mixture 90/10 |  | 3 | 3 | 2 | 2 |  |
| Mixture 95/05 |  | 2 | 2 | 2 | 2 |  |

Performance test in polystyrene, 95/05

|  | Styrene | c1 | c3 | WC1 | WC2 | Unit |
|---|---|---|---|---|---|---|
| Transparency | 1 | 2 | 3 | 2-3 | 2-3 | — |
| Release action | 1772 | 1585 | 1605 | 1557 | 1592 | N |

Use in PVC

The inventive mixtures were also tested in PVC against standard amide waxes and montan wax derivatives.
The following mixture was used as test formulation:
100 parts of Vinnolit S 3160, PVC from Vinnolit, 1.5 parts of Mark 17 MOK, 5 parts of Kane ABE-58A, 1 part of Paraloid K 120 N, 0.3 part of Loxiol G 16, 0.4 part of test product or comparative product.
c1=Hostalub FA1 amide wax, c3=Hostalub FA 5 amide wax The behavior of the inventive products was the same as that of the standard in terms of release action and lubricant action, and when compared with the prior-art products they were poorer in terms of color but better in terms of exudation behavior.

Performance test in PVC

|  | c1 | c3 | WC1 | WC2 |
|---|---|---|---|---|
| Release action | 3 | 3 | 3 | 3 |
| Color | 1 | 2 | 4 | 3 |
| Transparency | 90.0% | 90.0% | 90.0% | 90.0% |
| Exudation | 3 | 3 | 2 | 2 |
| Lubricant action | 3 | 3 | 3 | 3 |

Use in polycarbonate

Action was tested in a test formulation composed of 100 parts of Makrolon 3108, 0.5 part of wax composition/comparative product. The mixtures WC1 and WC2 were tested against Licolub FA1 and Licolub FA 5. Color, transparency, release action and melt index were tested.
Experiment Results on Polycarbonate:
Results from wax compositions composed of amide waxes in polycarbonate

| Polycarbonate VN | Makrolon M 3108 Wax | Amount [% by wt.] | Demolding force [N] | MVR 275° C./5 kg [cm$^3$/10 min] | Yellowness index | Transparency [%] |
|---|---|---|---|---|---|---|
| 91463 | — |  | 1800 | 12.5 | 2.33 | 88.8 |
| 91464 | Licolub FA 1 | 1 | 1700 | 17.4 | 2.15 | 88.9 |
| 91465 | Licolub FA 5 | 1 | 1700 | 13 | 2.45 | 88.9 |
| 91466 | FHG 514 | 1 | 1600 | 16.3 | 2.47 | 88.9 |
| 91467 | FHG 515 | 1 | 1600 | 15 | 2.46 | 88.9 |
| 91468 | Licolub FA 1 | 1.5 | 1300 | 24.6 | 1.92 | 89.3 |
| 91469 | Licolub FA 5 | 1.5 | 1500 | 15.1 | 2.38 | 88.9 |
| 91470 | FHG 514 | 1.5 | 1600 | 23.4 | 2.08 | 89.2 |
| 91471 | FHG 515 | 1.5 | 1600 | 20.6 | 1.76 | 89.4 |

FA 5 = Reaction product of hydroxystearic acid and tallow amine,
FA 1 = Reaction product of stearic acid and ethylenediamine,
FHG 515 = Mixture 2 (=WC2) of the examples
FHG 514 = Mixture 1 (=WC1) of the examples The table shows that the inventive wax compositions have good compatibility with polycarbonate and remain within the matrix even when the amounts added are relatively high. In terms of external action, no increase occurs in demolding force.

The invention claimed is:

1. A thermoplastic polymer comprising at least one thermoplastic polymer and a wax composition, wherein the wax composition comprises at least three amide waxes A, B, and C, wherein
    amide wax A is the reaction product of alkylenediamine with linear fatty acids or with mixtures of fatty acids,
    amide wax B is the reaction product of alkylenediamine with 12-hydroxystearic acid, and
    amide wax C is the reaction product of alkylenediamine with 12-hydroxystearic acid and with linear fatty acids and wherein the wax composition is present from 0.1 to 10% by weight.

2. The thermoplastic polymer as claimed in claim 1, wherein the wax composition is present from 0.2 to 5% by weight.

3. The thermoplastic polymer as claimed in claim 1, wherein the wax composition is present from 0.2 to 2% by weight.

* * * * *